Aug. 23, 1960

W. S. BLANDING ET AL 2,949,702

GLASS-METAL SEALING METHOD

Filed June 13, 1956

INVENTORS.
WENDELL S. BLANDING,
LAURENCE H. FOSTER
AND PAUL F. SPREMULLI.

BY Clarence R. Patty, Jr.
ATTORNEY

Aug. 23, 1960  W. S. BLANDING ET AL  2,949,702
GLASS-METAL SEALING METHOD
Filed June 13, 1956  4 Sheets-Sheet 3

INVENTORS.
WENDELL S. BLANDING,
LAURENCE H. FOSTER
AND PAUL F. SPREMULLI.

BY Clarence R. Oatly, Jr.
ATTORNEY

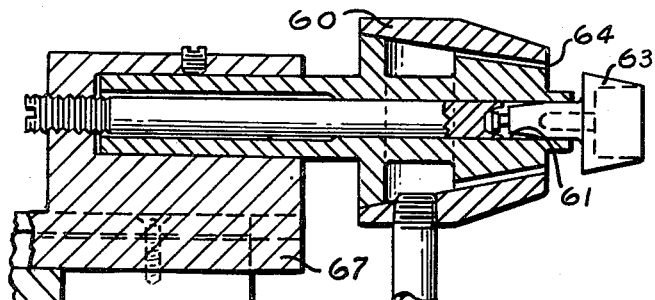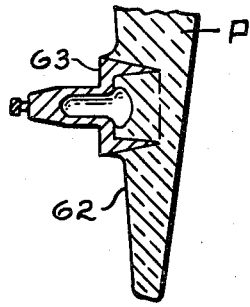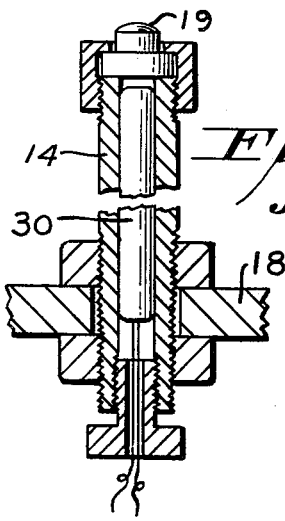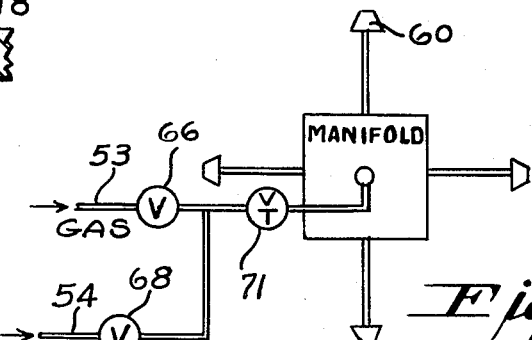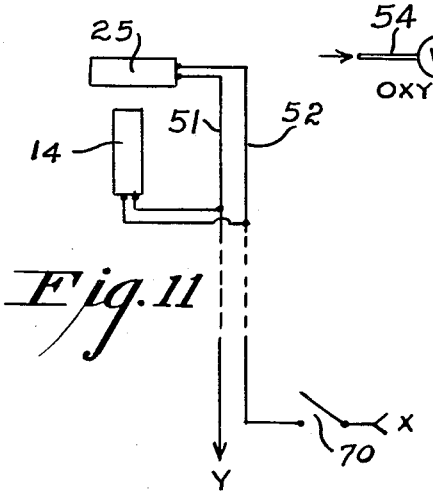
INVENTORS
WENDELL S. BLANDING,
LAURENCE H. FOSTER
AND PAUL F. SPREMULLI.
BY Clarence R. Patty
ATTORNEY United States Patent Office 2,949,702
Patented Aug. 23, 1960

2,949,702

GLASS-METAL SEALING METHOD

Wendell S. Blanding, Painted Post, and Laurence H. Foster and Paul F. Spremulli, Corning, N.Y., assignors to Corning Glass Works, Corning, N.Y., a corporation of New York Filed June 13, 1956, Ser. No. 591,179

6 Claims. (Cl. 49—81)

The present invention relates to inserting and sealing metal members into glass bodies and particularly to fabricating hollow articles of glass having metal inserts or members embedded in the inner surfaces of their walls, and provided with projecting portions suitable for use as supports for equipment therein. By way of example, such an article may be a skirted or walled panel to serve as the viewing screen for an all-glass television picture tube wherein an aperture mask or the like must be held within the cavity of the viewing screen.

According to the invention a number of cup-like metal inserts or members have their free wall edges adapted for being pressed into appropriately selected inner surface regions of the viewing screen wall or skirt after such inserts have been suitably heated and the glass in such regions heated to a workable temperature. Moreover, the inserts are made hollow to enable them to entrap air therein during the time that they are being forced into the softened glass. This entrapped air becomes highly heated and builds up pressure within an insert; and while the glass is still workable, is utilized to pneumatically pull the seal to give the glass the contour known to provide a strong and reliable seal along its lines of juncture with the insert.

Preparatory to the sealing of metal inserts or members in a glass panel, to avoid danger of thermal shock and possible breakage thereof during the process, it is preferable that the panels be preheated to the annealing temperature of the glass at least in the areas where the seals are to be made. If the entire panel is to be preheated such preheating can conveniently be effected in a suitable oven. If only the regions of the panel wall to be occupied by the inserts are to be preheated, broad heating flames may be directed towards the respective sealing regions for a suitable period before associating the panel with the sealing apparatus. Also to avoid thermal shock to the panel, applicants prefer to heat the respective parts of the apparatus that support and/or properly orient the panel with respect to associated mechanism for embedding the inserts into the glass. This is accomplished by electrically heating such parts. It is also essential that the panel be annealed after the inserts have been sealed therein, and this, of course, can be readily done in a suitable oven.

In carrying out the invention applicants prefer to place the panel at room temperature in a suitable container that extends only about the panel side wall or skirt and its front surface. With such a container structure the panel may be kept enclosed therein throughout the preheating, sealing and annealing cycle and allowed to again cool to a temperature at which it can be safely removed to room atmosphere.

For a better understanding of the invention reference is made to the accompanying drawings wherein:

Fig. 7 is an enlarged view of a fragment of the apparatus also on line 2—2 of Fig. 1 and including a side elevational view of a metal insert associated therewith.

Fig. 8 is a sectional view of a panel fragment and of an insert sealed therein.

Fig. 9 is a sectional view of one of the panel supporting elements.

Fig. 10 is a diagrammatic illustration of the gaseous fuel heating system of the apparatus.

Fig. 11 is a diagrammatic view illustrating the electric heating arrangement employed.

Figure 1:
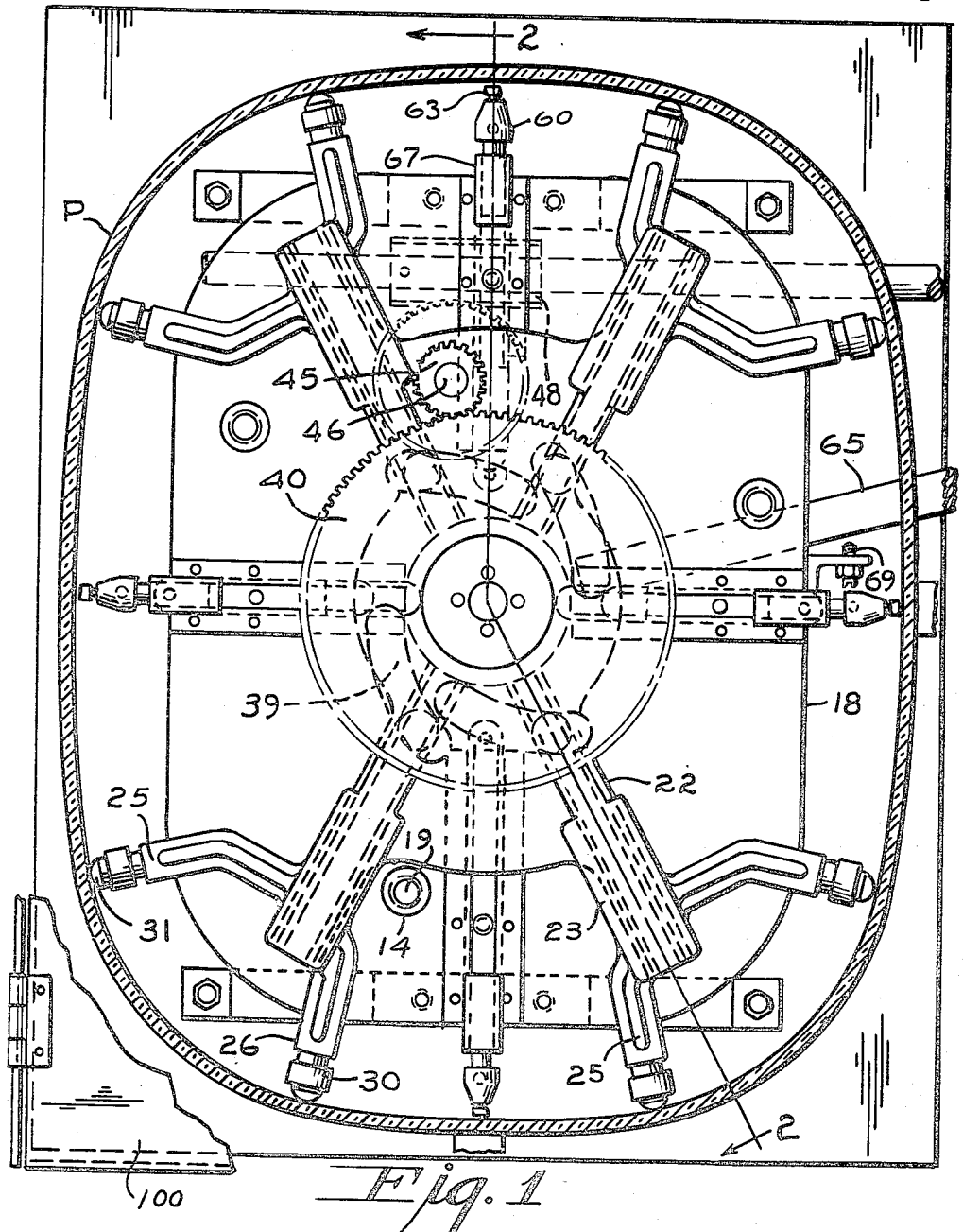
Fig. 1 is a sectional plan view of an apparatus embodying the invention showing the panel cover broken away for the most part and a sectional view of a panel taken through its side wall or skirt.
Figure 2:
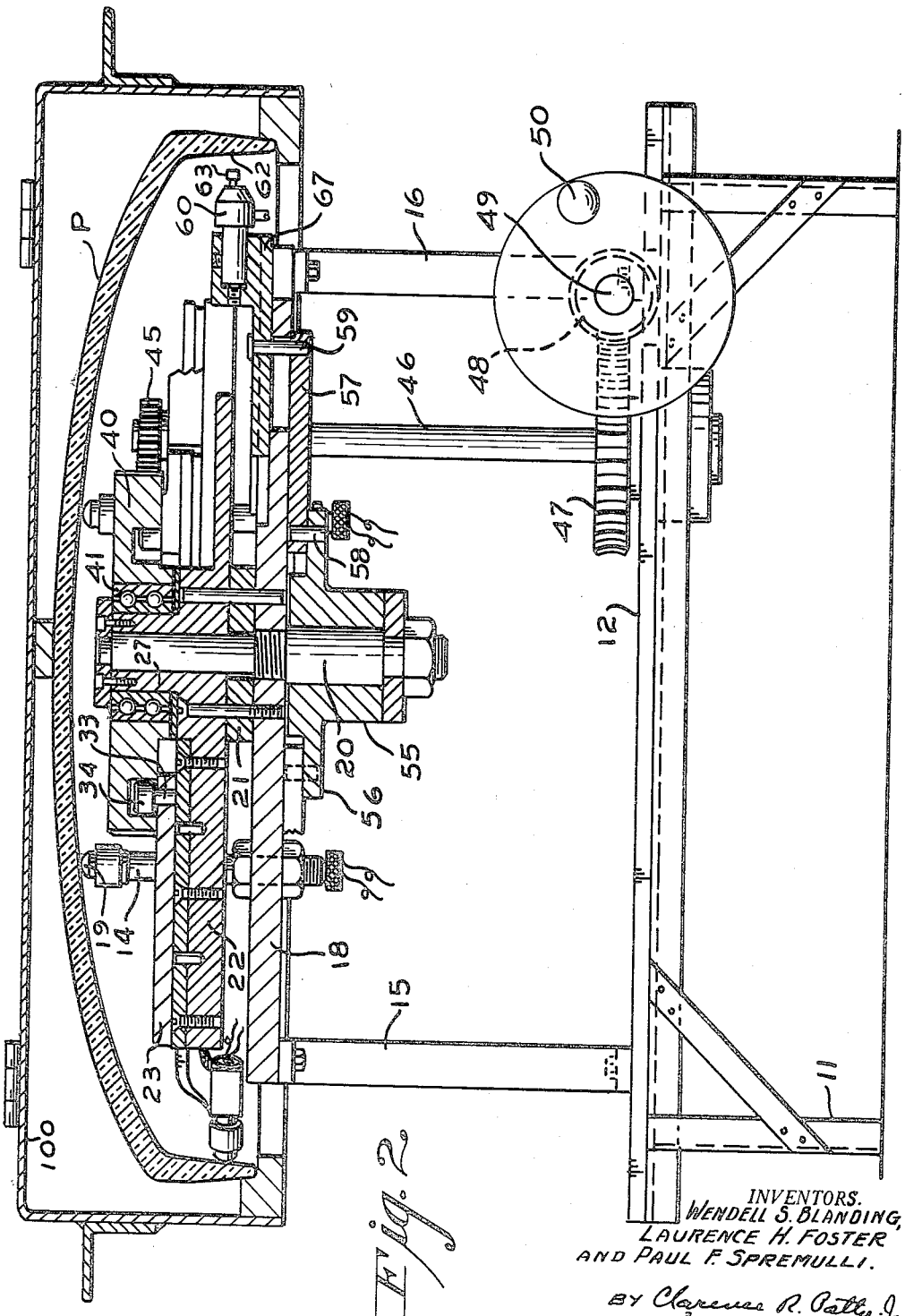
Fig. 2 is a sectional view of the apparatus and of a panel thereon taken generally along line 2—2 of Fig. 1.
Figure 3:
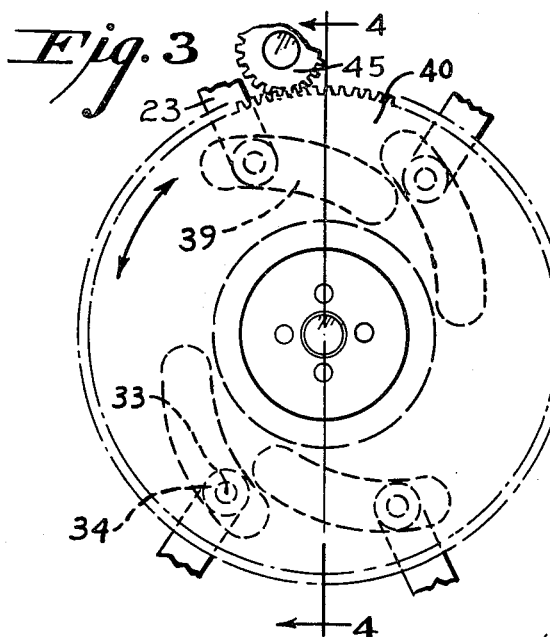
Figs. 3 and 4 are views of fragmentary portions of the apparatus having to do with laterally orienting a panel thereon.
Figure 4:
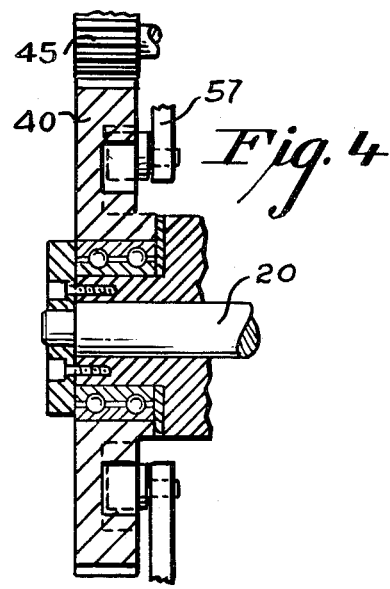

Referring to the drawings in detail, the sealing apparatus embodies a suitable table 11 provided with a top 12. Supported on top 12, by means of brackets such as 15 and 16 is a base plate 18 having a number of up-standing posts such as 14 (Figs. 1, 2, and 9) passing therethrough and provided at their free ends with panel supporting carbon buttons such as 19. Plate 18 also has a centrally disposed post 20 threaded therethrough. Arranged upon the upwardly projecting portion of post 20 is a spacer washer 21 and thence a generally X-shaped support 22 adapted to accommodate four diagonal slides such as 23 (Figs. 1 and 2). Each such slide has two branches, such as 25 and 26, at its outer end. Each branch carries a cartridge similar to 30 (Fig. 9) containing an electric heating element and is provided with a glass engaging button such as 31 of carbon. As illustrated in Figs. 2 and 3, the inner end of each slide, such as 23, is provided with an aperture occupied by a pin 33 carrying a cam roller 34. Each such cam roller occupies an arcuate slot such as 39 in a cam gear 40 turnable about a bearing 41 (Fig. 2) arranged about the hub 27 of the support 22. The cam gear 40 is turned by means of a pinion 45 in mesh therewith and carried on the upper end of a vertical shaft 46 passing down through a suitable bearing mounted in the table top 12. Shaft 46, just above the table top 12 is provided with a worm wheel 47 in mesh with a worm 48 carried by a horizontal shaft 49 equipped with a hand wheel and crank 50. As will be understood, by turning crank 50 the slides such as 23 may be advanced to cause branches such as 25 and 26 to engage their buttons, such as 31, with the wall of a panel such as P to shift it to a precise desired position.

Figure 6:
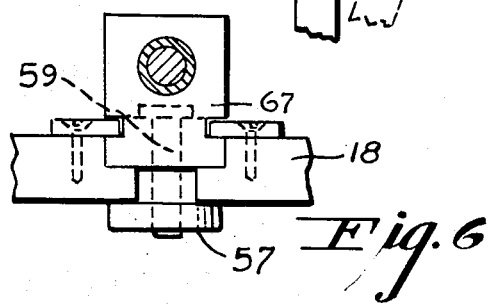
Fig. 6 is a view taken on line 6—6 of Fig. 5.

On the portion of the post 20 depending from the underside of plate 18 there is pivotally arranged a cam embodying a hub 55 and a flange 56. Coupled to flange 56 by means of links such as 57 and pins 58 and 59 are burner supporting slides such as 67 (Figs. 1, 2, and 7) arranged in ways (Fig. 6) formed in plate 18. Each of these slides at its outer end carries a burner assembly such as 60 having a metal insert or member receiving pocket 61 surrounded by gaseous fuel outlets such as 64 for directing flames toward a member such as 63 occupying such pocket and toward the adjacent panel wall surface 62 of the panel into which the element is to be sealed.

Figure 5:
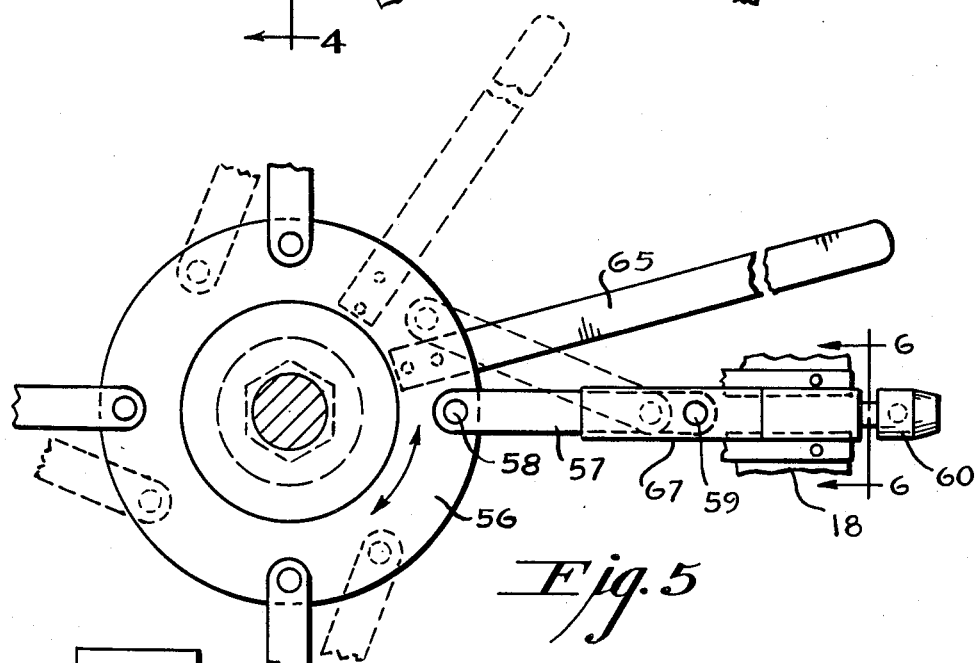
Fig. 5 is a view of fragmentary portions of the apparatus having to do with locally heating the metal inserts and the panel wall and the embedding of the inserts in the panel wall.

A lever 65 (Figs. 1 and 5) at one end is secured to the cam flange 56 and enables the cam to be turned to advance the burners toward the panel wall and to force the inserts such as 63 into sealing relation therewith after proper heating of the panel wall has been effected. Lever 65 engages an adjustable stop 69 (Fig. 1) on plate 18 when the inserts have been advanced a predetermined depth into the panel and on restoration backs the burners off the sealed-in inserts to permit the bubble of air entrapped in the cavity of insert 63 to give a slight outward thrust to the insert and thus impart a contour to the line of juncture of the glass and metal found to be of greatest possible strength.

As diagrammatically illustrated in Fig. 10 the respective burners such as 60 receive fuel from a manifold supplied by gas and oxygen lines 53 and 54 respectively via suitable regulating valves 66 and 68 and a throttle valve 71. As will be understood valve 71 may be manipulated in any desired manner to suitably regulate the burner flames as the lever 65 is manipulated to advance the inserts towards and into the panel wall.

As diagrammatically illustrated in Fig. 11 posts such as 14 and the slide branches such as 25 have their heating elements bridged across suitable heating current supply conductors 51 and 52 connected to the X and Y terminals of a suitable heating current source through a switch 70.

It has hereinbefore been stated that the panels are preferably preheated before sealing in the metal inserts and is annealed thereafter. Conveniently a panel, such as P, is inserted in a metal container 100 which leaves the interior of the panel exposed and available to the pin sealing apparatus so that the panel may be retained in such container throughout its preheating, sealing and annealing treatments.

The method of sealing an insert into a panel may be briefly summarized as follows: A panel is suitably preheated and placed upon the apparatus. The crank 50 is then turned to laterally orient the panel to a predetermined exact position with respect to the burners carrying the inserts. Valve 71 is then actuated and flames from the burners suitably regulated. When the panel wall regions opposite the respective burners have been heated to a softened or workable temperature the valve 71 is closed and the handle 65 actuated to advance the burners towards such regions and to force the inserts carried by them into the softened glass a distance determined by the setting of stop 69. While the glass is still workable lever 65 is restored to its initial position thus freeing the inserts for movement in an outward direction under the influence of air pressure developed within the insert cavities during the sealing operation, thus effectively pulling the seals.

Although a particular form of sealing apparatus has been herein shown and described and only one specific form of insert shown, modifications of such structures are believed to be well within the spirit and scope of the invention as claimed.

What is claimed is:

1. The method of sealing the free edge of the skirt of a skirted hollow insert member whose skirt borders the only entry into its cavity to a wall of a glass body, which includes heating the skirt of such member while heating a localized region of such body wall to which such member is to be sealed to its workable temperature, mechanically engaging the insert member and pressing the skirt thereof into cavity sealing relation of the member with the softened region of such body wall, heating the gas entrapped in the cavity of such member in the meantime, and effecting a repositioning movement of said member with respect to such body wall by air pressure within said member while the glass in such body wall is still soft.

2. A method such as defined by claim 1 which includes preheating the entire glass body to a temperature somewhat below its softening point immediately prior to heating the region to be occupied by such member to a workable temperature and annealing the body after the member has been sealed thereto.

3. A method such as defined by claim 1 which includes placing such glass body in a container and preheating it throughout before locally heating the skirt, annealing the glass body after such member has been repositioned, and thereafter removing the glass body from such container.

4. A method of sealing a hollow open top bordering the only entry into the cavity of a metal insert in the form of a cup into a relatively thick glass wall, which includes immediately surrounding the insert with a combustion burner with its flames directed toward the insert and toward the region of the glass wall into which the cup is to be sealed, facing the open top of the insert towards such wall and advancing it thereinto as the wall attains plasticity from such flames, subsequently withdrawing the burner from association with the insert while the glass in which it is embedded is still plastic and employing air trapped and heated within the insert cavity by the glass to force the insert outward to create a desired glass contour along its lines of junction with the insert.

5. The method of uniting the only cavity bordering wall region of a hollow metal insert with a glass body, which includes heating the region of the glass body to receive the insert to its workable temperature while also heating the insert to a similar temperature, engaging the insert and forcing the cavity bordering region of the wall thereof into the softened glass body, disengaging the insert and employing air pressure generated within the insert cavity after engagement of the region of its cavity bordering wall with the glass body to effect movement of the insert in the reverse direction.

6. A method such as defined by claim 5 wherein the heat applied is sufficient only to soften the wall to a depth less than the wall thickness so that its surface opposite the insert remains intact.

References Cited in the file of this patent

UNITED STATES PATENTS

| | | |
|---|---|---|
| 2,288,537 | Malloy | June 3, 1942 |
| 2,511,164 | Koch | June 13, 1950 |
| 2,515,706 | Greiner et al. | July 18, 1950 |
| 2,564,950 | Black | Aug. 21, 1951 |
| 2,579,222 | Wilder | Dec. 18, 1951 |
| 2,637,942 | Hinkley | May 12, 1953 |
| 2,659,183 | Anderson | Nov. 17, 1953 |
| 2,709,872 | Slomski | June 7, 1955 |
| 2,718,095 | Reiter et al | Sept. 20, 1955 |

FOREIGN PATENTS

| | | |
|---|---|---|
| 569,317 | Great Britain | May 17, 1945 |
| 742,565 | Great Britain | Dec. 30, 1955 |